(12) United States Patent
Nakamura

(10) Patent No.: US 10,321,063 B2
(45) Date of Patent: Jun. 11, 2019

(54) ELECTRONIC APPARATUS AND IMAGE PICKUP APPARATUS

(71) Applicant: CANON KABUSHIKI KAISHA, Tokyo (JP)

(72) Inventor: Hiroshi Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/789,703

(22) Filed: Oct. 20, 2017

(65) Prior Publication Data

US 2018/0115718 A1    Apr. 26, 2018

(30) Foreign Application Priority Data

Oct. 25, 2016  (JP) ................................ 2016-208688

(51) Int. Cl.
    *H04N 5/225*    (2006.01)
    *H04N 5/232*    (2006.01)
    *H04N 5/335*    (2011.01)

(52) U.S. Cl.
    CPC ....... *H04N 5/23293* (2013.01); *H04N 5/2251* (2013.01); *H04N 5/225251* (2018.08); *H04N 5/335* (2013.01)

(58) Field of Classification Search
    CPC ... H04N 5/23293; H04N 5/335; H04N 5/2251
    See application file for complete search history.

(56) References Cited

U.S. PATENT DOCUMENTS

| 7,738,656 | B2 * | 6/2010 | Yoda | H04M 1/0202 |
| | | | | 379/433.01 |
| 8,811,813 | B2 * | 8/2014 | Takahashi | H04N 5/2252 |
| | | | | 348/333.06 |
| 2003/0203747 | A1 * | 10/2003 | Nagamine | H04M 1/0243 |
| | | | | 455/575.3 |
| 2004/0185920 | A1 * | 9/2004 | Choi | H04M 1/021 |
| | | | | 455/575.1 |
| 2010/0234073 | A1 * | 9/2010 | Kusano | G06F 1/162 |
| | | | | 455/566 |
| 2013/0050557 | A1 * | 2/2013 | Moriyasu | H04N 5/2251 |
| | | | | 348/333.06 |
| 2014/0347542 | A1 * | 11/2014 | Ichikawa | H04N 5/23293 |
| | | | | 348/333.02 |

FOREIGN PATENT DOCUMENTS

JP    2014-038190 A    2/2014

* cited by examiner

*Primary Examiner* — Jason A Flohre

(74) *Attorney, Agent, or Firm* — Canon USA, Inc., IP Division

(57) ABSTRACT

An electronic apparatus includes a display unit configured to be rotatable with respect to a main body unit in a first direction about a first axis and a second direction about a second axis, a magnet configured to generate a magnetic field, a first sensor configured to detect, based on the magnetic field, a first state of the display unit in the first direction, a second sensor configured to detect, based on the magnetic field, a second state of the display unit in the second direction, a third sensor configured to detect, based on the magnetic field, a third state of the display unit, and a control unit configured to control a display state of the display unit based on the first state, the second state, and the third state.

10 Claims, 10 Drawing Sheets

FIG.8

| OPERATING STATE OF MOVABLE DISPLAY DEVICE 40 | STATE OF FIG.3A | STATE OF FIG.3B | STATE OF FIG.3C | STATE OF FIG.3D |
|---|---|---|---|---|
| DISPLAY STATE OF LCD PANEL 41 | TURNED-OFF | NORMAL DISPLAY | VERTICALLY INVERTED DISPLAY | VERTICALLY AND HORIZONTALLY INVERTED DISPLAY |
| DETECTED STATE OF OPEN/CLOSE SENSOR 50 | OFF | OFF | ON | OFF |
| DETECTED STATE OF ROTATION SENSOR 51 | OFF | OFF | ON | ON |
| DETECTED STATE OF CLOSE SENSOR 31 | ON | OFF | OFF | OFF |

ELECTRONIC APPARATUS AND IMAGE PICKUP APPARATUS

BACKGROUND

Field of the Disclosure

The present disclosure generally relates to electronics and, more particularly, to an electronic apparatus, an image pickup apparatus, and to an electronic apparatus including a movable display device.

Description of the Related Art

An electronic apparatus, such as a digital camera and a video camera, which includes a display unit that is openable, closable, and rotatable with respect to an electronic apparatus main body, has been conventionally known. Such an electronic apparatus performs vertical and horizontal inversion switching of an image displayed on a display unit, and turning on/off switching of the image, according to an open/close state and a rotation state of the display unit. In order to improve the reliability which may deteriorate due to space saving, or by non-contact, the electronic apparatus may detect the open/close state and the rotation state of a display unit (state detection) using a magnet and a magnetic sensor. Japanese Patent Application Laid-Open No. 2014-38190 discusses an electronic apparatus that switches a display state of a display unit according to the open/close state and/or rotation state of the display unit.

However, in the electronic apparatus discussed in Japanese Patent Application Laid-Open No. 2014-38190, the display state of the display unit is switched using two magnets. Accordingly, it is difficult to reduce the size of the external form of the display unit. In addition, if the two magnets have a similar size, a faulty assembly is likely to occur.

SUMMARY

The present disclosure is directed to an electronic apparatus and an image pickup apparatus capable of detecting a state of a display unit using a magnetic sensor, and reducing the size and being easily assembled.

According to one or more aspects of the present disclosure, an electronic apparatus includes a display unit configured to be rotatable with respect to a main body unit in a first direction about a first axis and a second direction about a second axis being different direction from the first axis, a magnet configured to generate a magnetic field, a first sensor configured to detect, based on the magnetic field, a first state of the display unit in the first direction, a second sensor configured to detect, based on the magnetic field, a second state of the display unit in the second direction, a third sensor configured to detect, based on the magnetic field, a third state of the display unit, and a control unit configured to control a display state of the display unit based on the first state, the second state, and the third state.

According to another aspect of the present disclosure, an image pickup apparatus includes an image sensor that performs photoelectric conversion on an optical image formed through an image pickup optical system, and the above-described electronic apparatus.

Further features of the present disclosure will become apparent from the following description of exemplary embodiments with reference to the attached drawings.

BRIEF DESCRIPTION OF THE DRAWINGS

FIG. 8 is a table illustrating a relationship between an operation state of the movable display device according to an exemplary embodiment, a display state of a liquid crystal display (LCD) panel, and a detected state of each sensor.

DESCRIPTION OF THE EMBODIMENTS

Exemplary embodiments of one or more aspects of the present disclosure will be described in detail below with reference to the drawings.

Figure 1A:
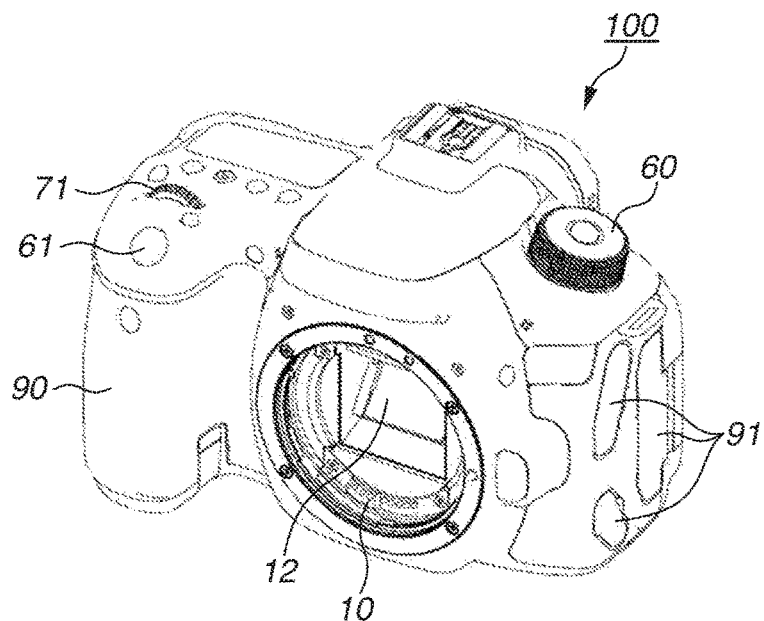
FIGS. 1A and 1B are perspective views each illustrating an external appearance of an image pickup apparatus according to one or more aspects of the present disclosure.
Figure 1B:
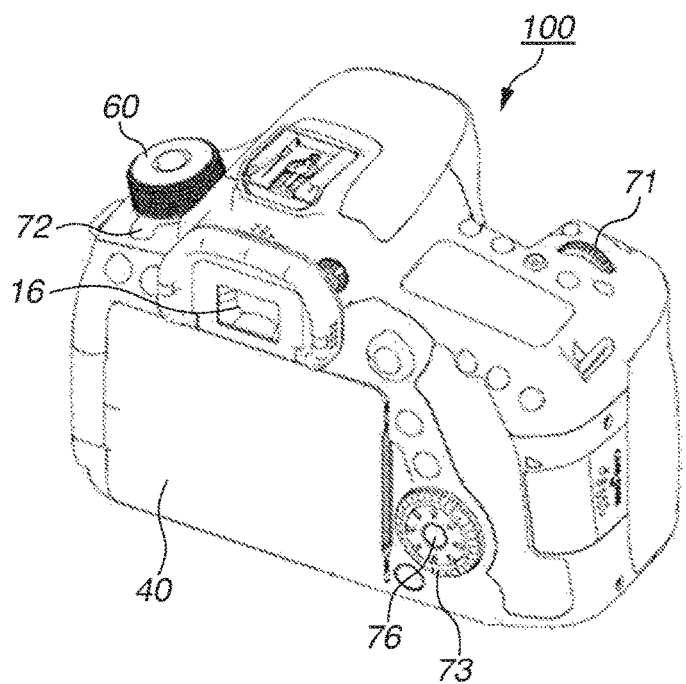
Figure 2:
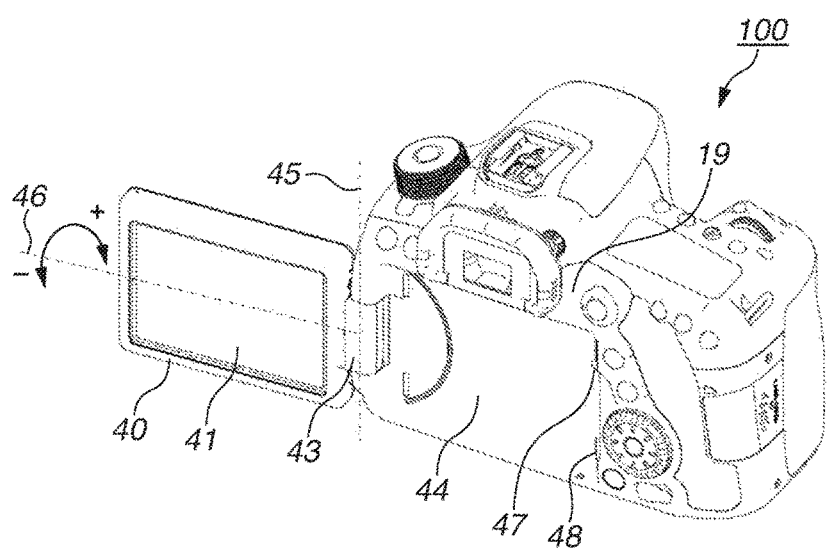
FIG. 2 is a perspective view illustrating a rear side of the image pickup apparatus in a state where a display device is opened according to one or more aspects of the present disclosure.

First, an electronic apparatus (image pickup apparatus) according to an exemplary embodiment will be described with reference to FIGS. 1A, 1B, and 2. FIGS. 1A and 1B are perspective views each illustrating an external appearance of an image pickup apparatus 100 (single-lens reflex camera). FIG. 1A is a front view of the image pickup apparatus 100, and FIG. 1B is a rear view of the image pickup apparatus 100. FIG. 2 is a rear perspective view illustrating the image pickup apparatus 100 in a state where a movable display device 40 (display device) is opened.

In the image pickup apparatus 100, a shutter button 61 is an operation unit used by a user to send an imaging instruction. A mode changing switch 60 is an operation unit for switching various modes. A terminal cover 91 is a cover for protecting a connector (not illustrated) of a connection cable or the like that connects an external device with the image pickup apparatus 100. An electronic main dial 71 is a rotatable operation member. By rotating the electronic main dial 71, various setting values such as a shutter speed and an aperture value can be changed. A power switch 72 is an operation member for switching power supply for the image pickup apparatus 100 on and off. An electronic sub-dial 73 is a rotation operation member, and can move a selection frame and perform image feeding. A SET button 76 is a press button, and may be used for determining a selection item.

Figure 5:
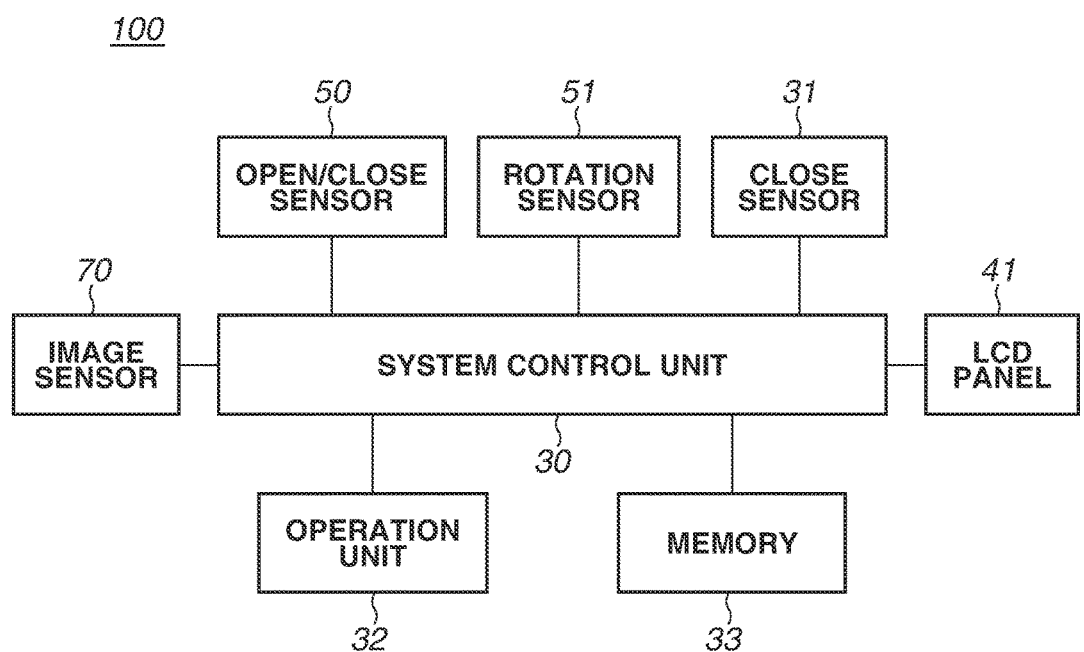
FIG. 5 is a block diagram illustrating the image pickup apparatus according to one or more aspects of the present disclosure.

A quick return mirror 12 is turned by an actuator (not illustrated) based on a command from a system control unit 30 (see FIG. 5). A communication terminal 10 is a communication terminal used when the image pickup apparatus 100 communicates with an attachable/detachable imaging lens (interchangeable lens) which is not illustrated. An eyepiece finder 16 is a look-in type finder for checking a focal point and a composition of an optical image of an object obtained through an imaging lens by the user observing a focusing screen (not illustrated). A grip unit 90 is a holding unit having a shape to be easily grasped with a user's right hand when the user holds the image pickup apparatus 100 to prepare for the imaging.

The movable display device 40 includes a liquid crystal display (LCD) panel 41 (display unit). The movable display device 40 is rotatably supported by two axes in a horizontal rotation direction (first direction) about an open/close axis 45 (first axis) and a vertical rotation direction (rotation direction, second direction) about a rotation axis 46 (second axis) through a hinge unit 43. The first direction corresponds to an open/close direction of the LCD panel 41 with respect to a main body unit (a part of the image pickup apparatus 100 except for the movable display device 40) of the image pickup apparatus 100. The second direction corresponds to a rotation direction of the LCD panel 41 with respect to the main body unit. In the present exemplary embodiment, the open/close axis 45 and the rotation axis 46 are perpendicular to each other. In this way, the LCD panel 41 is held in the movable display device 40 that is rotatable in each of the first direction and the second direction with respect to the main body unit of the image pickup apparatus 100 through the hinge unit 43.

A storage surface 44 is a surface that faces the movable display device 40 when the movable display device 40 is stored, and is a recessed bottom surface formed in a rear surface cover 19 in a state where the movable display device 40 is open (open state). The rear surface cover 19 is provided with an engaging claw 47. When the movable display device 40 is stored in the rear surface cover 19, the movable display device 40 can be engaged with the engaging claw 47. The storage surface 44 is provided with an elastic member 48. The elastic member 48 is brought into a compressed state in the state where the movable display device 40 is stored and engaged with the engaging claw 47, and urges the movable display device 40 against the engaging claw 47.

In the present exemplary embodiment, the state (state illustrated in FIG. 1B) in which the movable display device 40 is stored in such a manner that the storage surface 44 and the LCD panel 41 face each other is defined as an open/close angle 0° and a rotation angle 0°. In the present exemplary embodiment, the movable display device 40 is rotatable within the range of an open/close angle of 0° to 175° and within the range of a rotation angle of −90° to 180° (i.e., within a rotation angle range up to 180° in a +direction illustrated in FIG. 2 and within a rotation angle range up to 90° in a − direction illustrated in FIG. 2). However, the present exemplary embodiment is not limited to this example. The rotatable range of the movable display device 40 can be changed as appropriate depending on the intended use.

Next, the operation state and display state of the movable display device 40 according to the present exemplary embodiment will be described with reference to FIGS. 3A to 3D and FIGS. 4A to 4C. FIGS. 3A to 3D are views each illustrating the operation state of the movable display device 40. FIGS. 4A to 4C are views each illustrating the display state of the movable display device 40, and illustrate the display images of the LCD panel 41 that are obtained in the states illustrated in FIGS. 3A, 3B, 3C, and 3D, respectively, during live view imaging.

In the main body unit of the image pickup apparatus 100, an open/close sensor 50 (first sensor), a rotation sensor 51 (second sensor), and a close sensor 31 (third sensor), which are used to detect the operation state of the movable display device 40, are provided. In the movable display device 40, a magnet 52 that generates a magnetic field for causing each sensor to react is provided. FIGS. 3A to 3D each illustrate the open/close sensor 50, the rotation sensor 51, and the close sensor 31 in a state to be seen through the rear surface cover 19, and also illustrate the magnet 52 to be seen through the movable display device 40.

The open/close sensor 50 detects, based on the magnetic field generated by the magnet 52, the operation state (first state) of the LCD panel 41 in the open/close direction, that is, the open/close state of the LCD panel 41 with respect to the main body unit. The rotation sensor 51 detects, based on the magnetic field generated by the magnet 52, the operation state (second state) of the LCD panel 41 in the rotation direction, that is, the rotation state of the LCD panel 41 with respect to the main body unit. The close sensor 31 detects, based on the magnetic field generated by the magnet 52, the operation state (third state) of the LCD panel 41, that is, the close state of the LCD panel 41 with respect to the main body unit.

In the present exemplary embodiment, Giant MagnetoResistance (GMR) elements for detecting a magnetic field parallel to a mounting surface may be used as the open/close sensor 50 and the rotation sensor 51. In the present exemplary embodiment, a Hall element for detecting a magnetic field perpendicular to the mounting surface may be used as the close sensor 31. However, the present exemplary embodiment is not limited to these examples, and other types of elements may be used as the sensors.

In the present exemplary embodiment, the magnet 52 may be provided at a position closer to the hinge unit 43 (i.e., the open/close axis 45) than to the center of the movable display device 40. In other words, a distance between the magnet 52 and the open/close axis 45 may be shorter than a distance between the center of the movable display device 40 (LCD panel 41) and the open/close axis 45. In the present exemplary embodiment, the open/close sensor 50 and the rotation sensor 51 are provided on (or in the vicinity of) the open/close axis 45. On the other hand, the close sensor 31 is provided at a position shifted from the open/close axis 45. In the present exemplary embodiment, a first area including the open/close sensor 50 and the rotation sensor 51 and a second area including the close sensor 31 may be provided at positions symmetrical with respect to the rotation axis 46. The term "first area" used herein refers to an area located above the rotation axis 46 and located at a predetermined distance from the rotation axis 46 (or an extension of the rotation axis 46) in FIGS. 3A to 3D. The term "second area" used herein refers to an area located below the rotation axis 46 and located at a predetermined distance from the rotation axis 46.

Figure 3A:
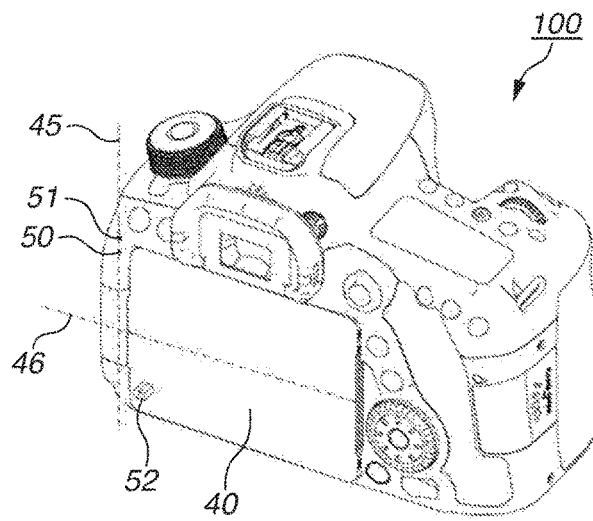
FIGS. 3A, 3B, 3C, and 3D are views each illustrating an operation state of a movable display device according to one or more aspects of the present disclosure.
Figure 3B:
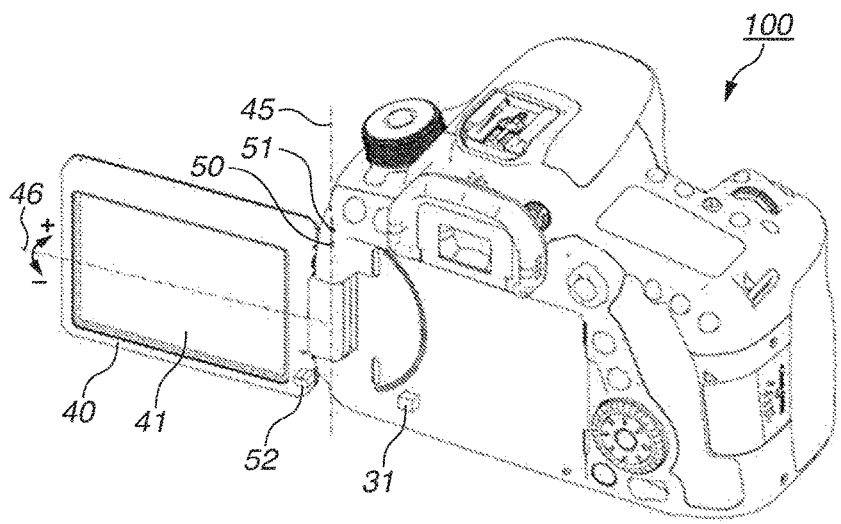
Figure 4A:
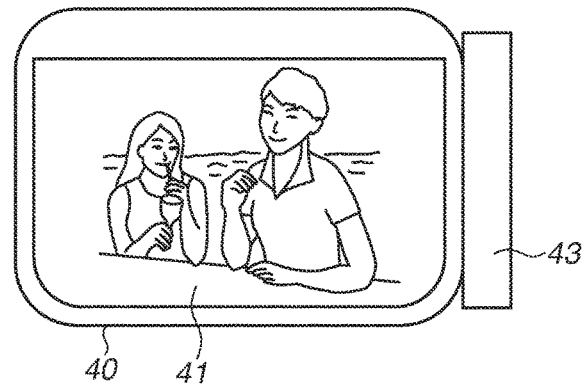
FIGS. 4A, 4B, and 4C are views each illustrating a display state of the movable display device according to one or more aspects of the present disclosure.
Figure 4B:
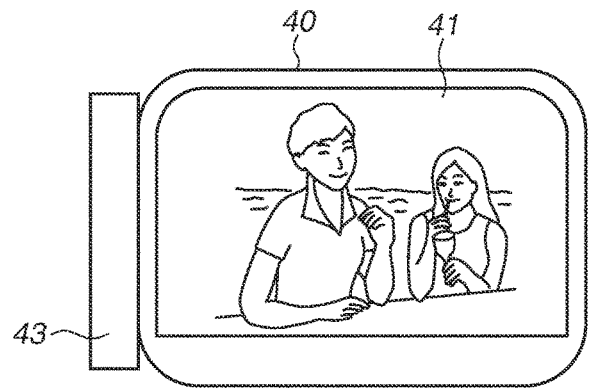
Figure 4C:
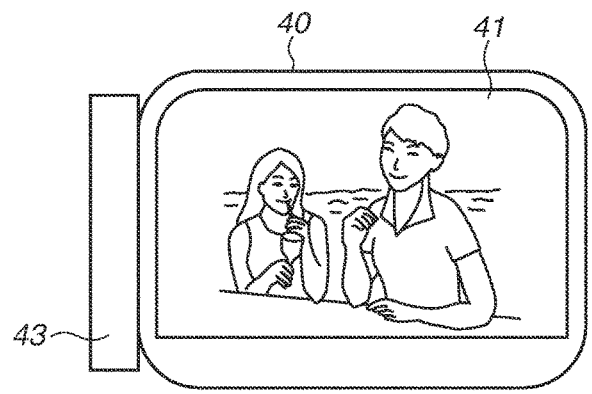

In the state illustrated in FIG. 3A, the movable display device 40 is stored in such a manner that the LCD panel 41 faces the storage surface 44 (open/close angle 0° and rotation angle 0°). In this state, the close sensor 31 detects that the movable display device 40 is closed (close state), and the system control unit 30 (see FIG. 5) turns off the LCD panel 41 (turned-off state). When the movable display device 40 is gradually opened about the open/close axis 45 from this state, the detection of the close state by the close sensor 31 turns off at a predetermined angle, and the system control unit 30 turns on the LCD panel 41 (turned-on state). FIG. 3B illustrates a state where the movable display device 40 is fully opened about the open/close axis 45 (open/close angle 175° and rotation angle 0°). In the present exemplary embodiment, the display state of the LCD panel 41 in the state of the movable display device 40 illustrated in FIG. 3B is referred to as a normal display state. FIG. 4A illustrates the LCD panel 41 in the normal display state.

Figure 3C:
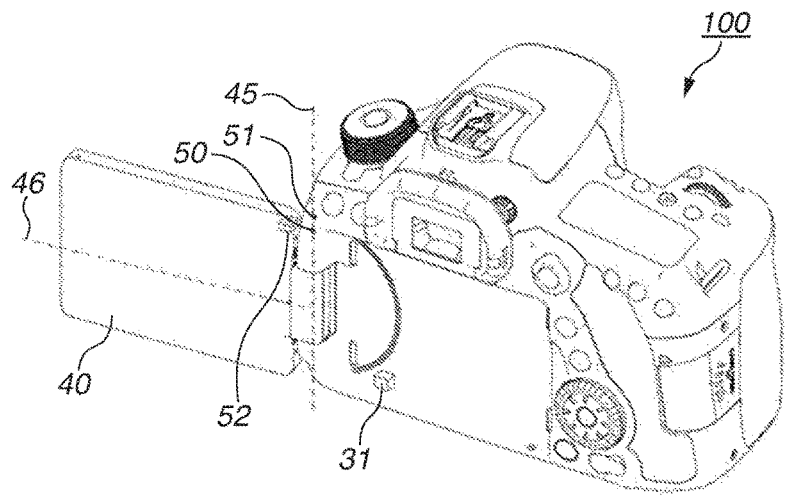

When the movable display device 40 is rotated in the + direction about the rotation axis 46 from the state illustrated in FIG. 3B, the open/close sensor 50 and the rotation sensor 51 detect the magnetic field generated by the magnet 52 at a predetermined angle. After that, when the movable display device 40 is further rotated in the + direction, as illustrated in FIG. 3C, the movable display device 40 is rotated by +180° (open/close angle 175° and rotation angle +180°). FIG. 4B illustrates the display state of the LCD panel 41 in the state where the open/close sensor 50 and the rotation sensor 51 detect the magnetic field of the magnet 52. The display state of the LCD panel 41 illustrated in FIG. 4B is controlled by the system control unit 30 to be in a state where the display image is vertically inverted from the normal display state (vertically inverted display, i.e., mirror image display as viewed from the user). This display state is suitable for the user to perform self-imaging.

Figure 3D:
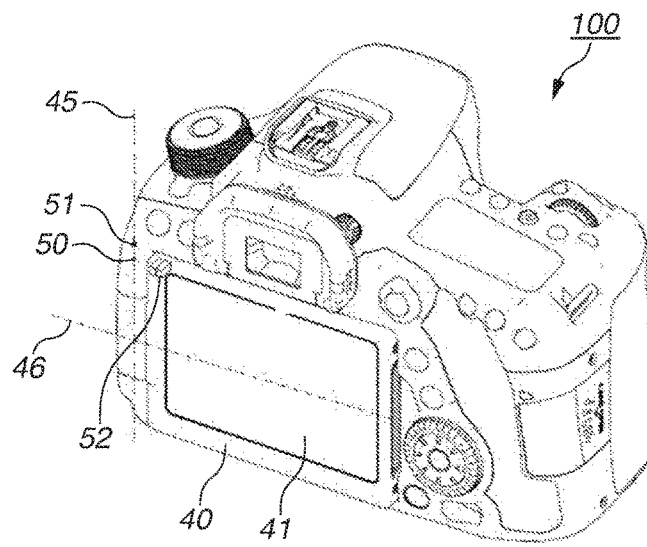

When the movable display device 40 is gradually closed about the open/close axis 45 from the state illustrated in FIG. 3C, the detection by the open/close sensor 50 is not made (the detection by the open/close sensor 50 turns off) at a predetermined angle, and only the detection by the rotation sensor 51 is made. After that, when the movable display device 40 is further closed, as illustrated in FIG. 3D, the movable display device 40 is stored in the recess of the rear surface cover 19 so that the LCD panel 41 can be seen by the user (open/close angle 0° and rotation angle 180°). FIG. 4C illustrates the display state of the LCD panel 41 in the state where only the detection by the rotation sensor 51 is made. The display state of the LCD panel 41 is controlled by the system control unit 30, and is changed from the normal display state to a vertically and horizontally inverted state (horizontally and vertically inverted display). In this state, the electronic apparatus can be used with the same feeling as that of an electronic apparatus including a non-movable display device formed on a rear surface thereof.

Next, the configuration of the image pickup apparatus 100 in association with the display control of the LCD panel 41 will be described with reference to FIG. 5. FIG. 5 is a block diagram of the image pickup apparatus 100. The system control unit 30 (control unit), which may include one or more processors and one or more memories, such as a central processing unit (CPU), or the like, controls the entire image pickup apparatus 100, i.e., controls the operation of each unit, the image display of the LCD panel 41, and the like. The operation unit 32 includes various operation members, such as the shutter button 61 and the electronic main dial 71, as an input unit that accepts an operation from the user. A memory 33 is a memory unit that stores control programs and various data. An image sensor 70 may include a Complementary Metal Oxide Semiconductor (CMOS) sensor and a Charge Coupled Device (CCD) sensor and obtains an image (image data) by performing photoelectric conversion on an optical image formed through an imaging lens (image pickup optical system). The system control unit 30 reads out the control programs and data stored in the memory 33, and performs various control operations, such as the image display control of the LCD panel 41, based on the control programs and data. The system control unit 30 controls the display state of the LCD panel 41 based on the operation state (combinations of the first state, the second state, and the third state) of the LCD panel 41. More specifically, the system control unit 30 changes the display state of the image obtained by the image sensor 70 on the LCD panel 41 based on signals obtained from the open/close sensor 50, the rotation sensor 51, and the close sensor 31 (according to the operation state of the movable display device 40).

Figure 6A:
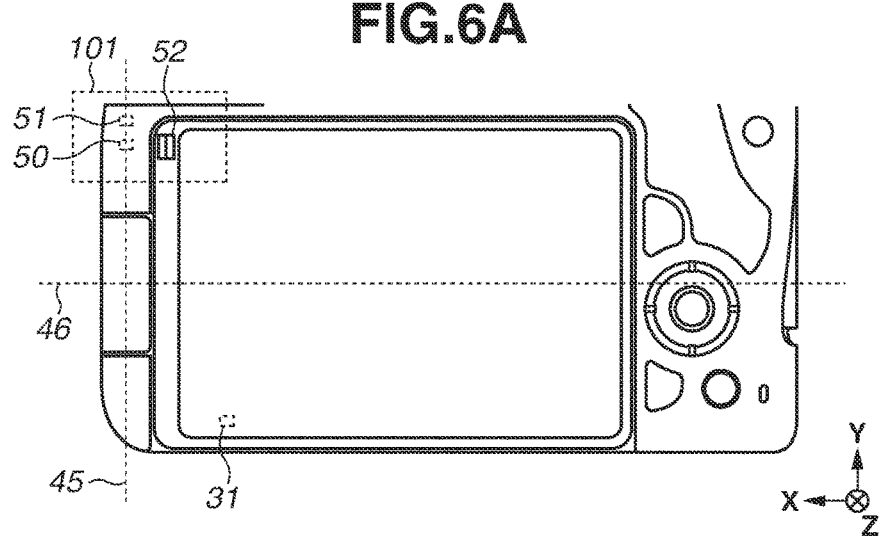
FIG. 6A is a rear view of the image pickup apparatus according to an exemplary embodiment in the state illustrated in FIG. 3D.
Figure 6B:
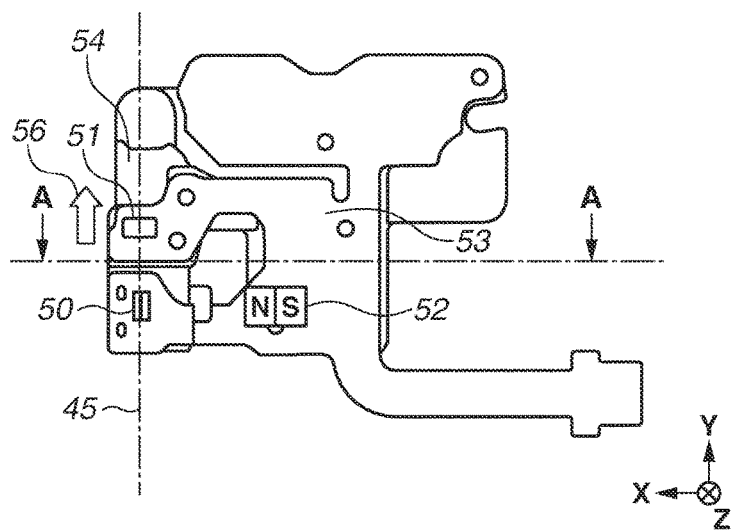
FIG. 6B is an enlarged view illustrating the image pickup apparatus illustrated in FIG. 6A according to an exemplary embodiment.
Figure 6C:
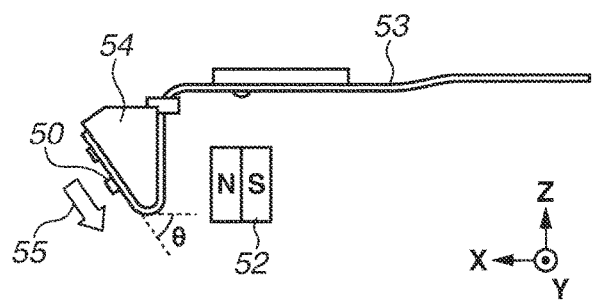
FIG. 6C is a sectional view taken along a line A-A in FIG. 6B according to an exemplary embodiment.

Next, the arrangement of the open/close sensor 50, the rotation sensor 51, the close sensor 31, and the magnet 52 will be described in detail with reference to FIGS. 6A to 6E. FIG. 6A is a rear view illustrating the image pickup apparatus 100 in the state illustrated in FIG. 3D. FIG. 6B is an enlarged view illustrating a range 101 in FIG. 6A, in which the illustration of an area excluding the open/close sensor 50, the rotation sensor 51, the magnet 52, and peripheral areas thereof is omitted. FIG. 6C is a sectional view taken along a line A-A in FIG. 6B.

Referring to FIG. 6B, the magnet 52 has a north pole on the left side thereof and a south pole on the right side thereof. The magnet 52 is disposed in such a manner that a direction (X-direction) perpendicular to a direction (Y-direction) along the open/close axis 45 matches a magnetized direction. The open/close sensor 50 and the rotation sensor 51 are mounted on a flexible printed circuit (FPC) 53. The FPC 53 is attached to a resin part 54 with a double-sided adhesive tape. As illustrated in FIG. 6C, the attachment surface of the open/close sensor 50 in the resin part 54 is inclined at an angle θ with respect to an XY plane in FIGS. 6A to 6E, and the open/close sensor 50 is disposed (attached) so as to be inclined with respect to the magnetized direction of the magnet 52. With this arrangement, the open/close sensor 50 is disposed so as to detect the magnetic field (magnetic field in a direction inclined with respect to the magnetized direction of the magnet 52) at the predetermined angle θ in a XZ plane (in a direction indicated by an arrow 55 in FIG. 6C).

The rotation sensor 51 is disposed so as to detect the magnetic field (magnetic field in a direction parallel to the open/close axis 45) in the Y-direction (direction indicated by an arrow 56 in FIG. 6B). The center of measurement in the detection of the magnetic field by each of the open/close sensor 50 and the rotation sensor 51 is disposed on the open/close axis 45 of the movable display device 40. In order for the open/close sensor 50 to detect a magnetic field strongly from the magnet 52, it is preferable to set the distance from the center of the open/close sensor 50 (the center of measurement in the detection of the magnetic field) to the rotation axis 46 of the movable display device 40 to be substantially the same as the distance from the center of the magnet 52 to the rotation axis 46. The meaning of the phrase "substantially the same" includes a case where the distances are not exactly the same, but are evaluated to be substantially the same. In such an arrangement, the center of the rotation sensor 51 (the center of measurement in the detection of the magnetic field) is preferably disposed separately from the open/close sensor 50 at a position where the effect of the magnetic field received from the magnet 52 on the open/close axis 45 is strongest.

Figure 6D:
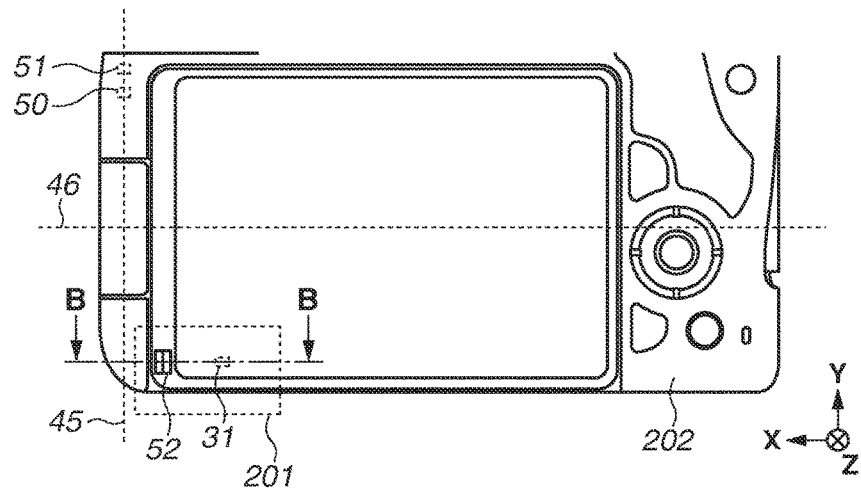
FIG. 6D is a rear view illustrating the image pickup apparatus according to an exemplary embodiment in the state illustrated in FIG. 3A.
Figure 6E:
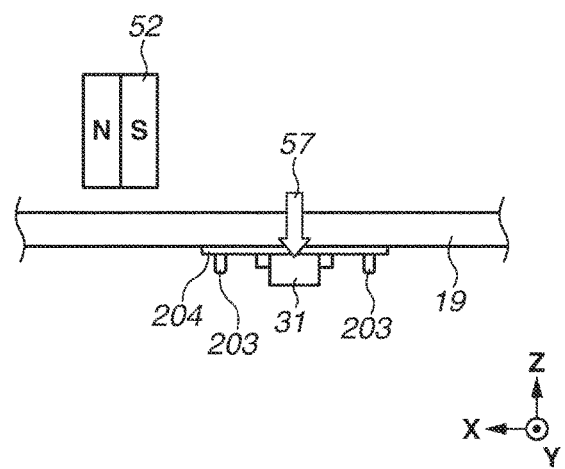
FIG. 6E is an enlarged sectional view taken along a line B-B of the image pickup apparatus illustrated in FIG. 6D according to an exemplary embodiment.

FIG. 6D is a rear view illustrating the image pickup apparatus 100 in the state illustrated in FIG. 3A. FIG. 6E is an enlarged sectional view of a range 201 taken along a line B-B in FIG. 6D, in which the illustration of an area excluding the close sensor 31, the magnet 52, and peripheral areas thereof is omitted.

Referring to FIG. 6E, the magnet 52 has a north pole on the left side thereof and a south pole on the right side thereof. The magnet 52 is disposed so that the X-direction matches the magnetized direction. The close sensor 31 is mounted on an FPC 204. The FPC 204 is press-fit onto a boss 203, which is formed on the rear surface cover 19, thereby being positioned and fixed. The close sensor 31 is disposed so as to detect a Z-direction (direction indicated by an arrow 57 in FIG. 6E) of the magnetic field from the magnet 52. At this time, a south pole magnetic flux of the magnet 52 enters from the mounting surface of a Hall IC which is used as the close sensor 31. In the present exemplary embodiment, the Hall IC of a north pole detection type for detecting a north pole magnetic flux from a top surface is used as the close sensor 31. However, the present exemplary embodiment is not limited to this example. The angle of detection of the close sensor 31 can be changed by changing the distance between the magnet 52 and the close sensor 31 in the X-direction.

Figure 7A:
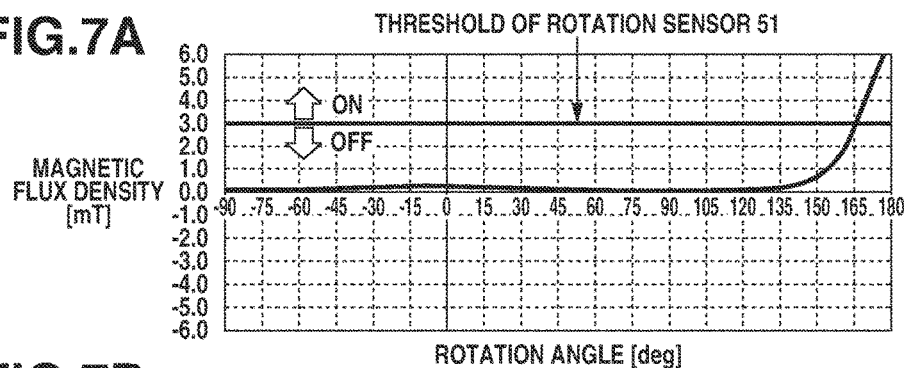
FIGS. 7A, 7B, 7C, and 7D are graphs each illustrating a relationship between an operation state of the movable display device according to an exemplary embodiment and a magnetic flux density detected by each sensor.
Figure 7B:
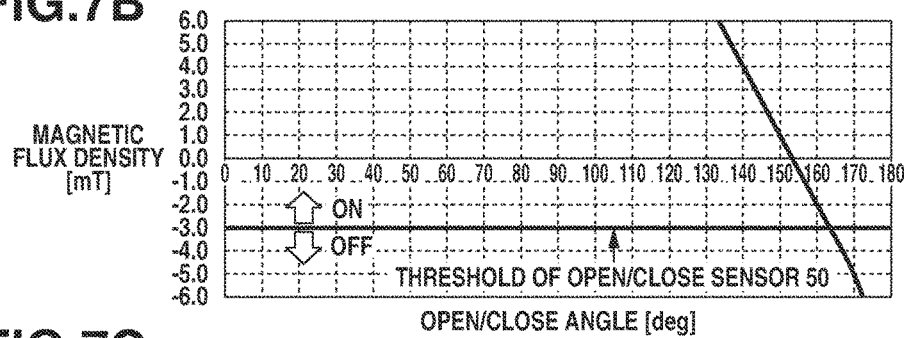
Figure 7C:
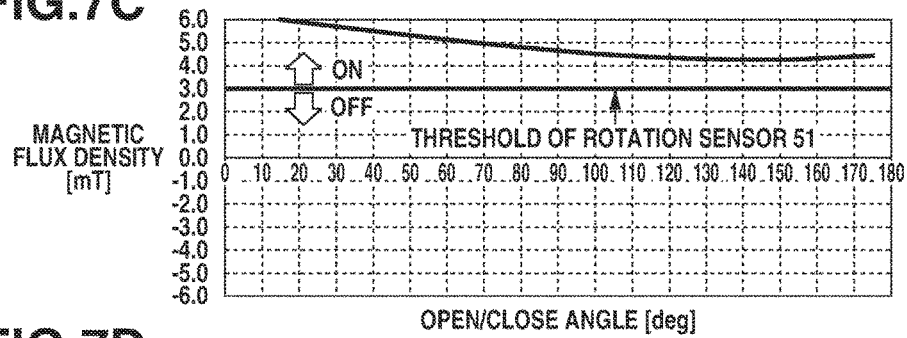
Figure 7D:
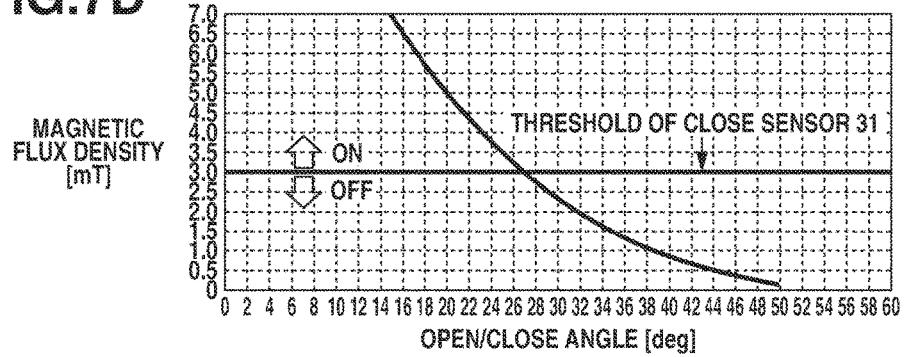

Next, the relationship between the operation state of the movable display device 40 and a magnetic flux density detected by each sensor will be described with reference to FIGS. 7A, 7B, 7C, and 7D. FIGS. 7A, 7B, 7C, and 7D are graphs each illustrating the relationship between the operation state of the movable display device 40 and the magnetic flux density detected by each sensor. In FIG. 7A, the horizontal axis represents an open/close angle [deg] and the vertical axis represents a magnetic flux density [mT]. In FIGS. 7B, 7C, and 7D, the horizontal axis represents a rotation angle [deg] and the vertical axis represents a magnetic flux density [mT].

FIG. 7A illustrates a change in the magnetic flux density detected by the rotation sensor 51 when the movable display device 40 is moved from the state illustrated in FIG. 3B to the state illustrated in FIG. 3C. FIG. 7A also illustrates a threshold for the magnetic flux density detected by the rotation sensor 51 (a threshold for ON/OFF state of the rotation sensor 51). When the state is changed from the state illustrated in FIG. 3B to the state illustrated in FIG. 3C, that is, when the rotation angle is changed from 0° to +180° in a state where the open/close angle is fixed at 175°, the magnetic flux density generated by the magnet 52 exceeds the threshold of the rotation sensor 51 in the vicinity of a rotation angle 165°. Accordingly, the rotation sensor 51 is turned on in the vicinity of the rotation angle 165°. On the other hand, when the movable display device 40 is rotated in the opposite direction to reach a rotation angle −90°, the magnetic flux density generated by the magnet 52 does not exceed the threshold of the rotation sensor 51, and thus the rotation sensor 51 remains off. In the present exemplary embodiment, the threshold of the rotation sensor 51 is not limited to this example, and a threshold corresponding to an angle other than the rotation angle 165° may be set.

FIG. 7B illustrates a change in the magnetic flux density detected by the open/close sensor 50 when the movable display device 40 is moved from the state illustrated in FIG. 3D to the state illustrated in FIG. 3C. FIG. 7B also illustrates a threshold for the magnetic flux density detected by the open/close sensor 50 (a threshold for ON/OFF state of the open/close sensor 50). When the state is changed from the state illustrated in FIG. 3D to the state illustrated in FIG. 3C, that is, when the rotation angle is changed from 0° to 175° in a state where the rotation angle is fixed at 180°, the magnetic flux density generated by the magnet 52 exceeds the threshold of the open/close sensor 50 in the vicinity of an open/close angle 163°. Accordingly, the open/close sensor 50 is turned on in the vicinity of the open/close angle 163°. In the present exemplary embodiment, the threshold of the open/close sensor 50 is not limited to this example, and a threshold corresponding to an angle other than the open/close angle 163° may be set. When the open/close angle is changed, for example, the inclination (the angle θ in FIG. 6C) for attachment of the open/close sensor 50 may be changed. For example, when the threshold of the open/close sensor 50 is changed from the vicinity of 163° to the vicinity of 170°, the angle θ of the resin part 54 illustrated in FIG. 6C is increased and the magnetic field detection direction is rotated by about 7° within the XZ plane, without changing the measurement center position of the open/close sensor 50.

In this way, in the present exemplary embodiment, when the threshold for the angle (open/close angle) detected by the open/close sensor 50 is changed to a desired angle, the electronic apparatus can be designed intuitively and easily without the need for performing a simulation or the like. With this configuration, only the inclination for attachment is changed without moving the position of the open/close sensor 50. Therefore, an increase in the size of, for example, the external form can be avoided, and an increase in the size of the electronic apparatus can also be avoided.

FIG. 7C illustrates a change in the magnetic flux density detected by the rotation sensor 51 when the movable display device 40 is moved from the state illustrated in FIG. 3D to the state illustrated in FIG. 3C. FIG. 7C also illustrates a threshold for the magnetic flux density detected by the rotation sensor 51 (a threshold for ON/OFF state of the rotation sensor 51). When the state is changed from the state illustrated in FIG. 3D to the state illustrated in FIG. 3C, that is, when the open/close angle is changed from 0° to 175° in a state where the rotation angle is fixed at +180°, the magnetic flux density generated by the magnet 52 constantly exceeds the threshold of the rotation sensor 51 as illustrated in FIG. 7C. Accordingly, the rotation sensor 51 is constantly in the ON state. This is because during the change from the state illustrated in FIG. 3D to the state illustrated in FIG. 3C, a positional relationship between the magnet 52 and the rotation sensor 52 (relationship between the magnetized direction of the magnet 52 and the magnetic field detection direction of the rotation sensor 51) is set so that the magnetic flux density detected by the rotation sensor 51 constantly exceeds the threshold of the rotation sensor 51.

FIG. 7D illustrates a change in the magnetic flux density detected by the close sensor 31 when the movable display device 40 is moved from the state illustrated in FIG. 3B to the state illustrated in FIG. 3A. FIG. 7D also illustrates a threshold for the magnetic flux density detected by the close sensor 31. When the movable display device 40 is moved in a direction in which the open/close angle of the movable display device 40 is decreased, i.e., in a direction in which the movable display device 40 is closed, the magnetic flux density detected by the close sensor 31 gradually increases. In the present exemplary embodiment, when the open/close angle is about 27°, the magnetic flux density detected by the close sensor 31 exceeds the threshold of the close sensor 31, and thus the close sensor 31 is turned on. During the change from the state illustrated in FIG. 3B to the state illustrated in FIG. 3A, the magnet 52 is kept at a sufficient distance from each of the open/close sensor 50 and the rotation sensor 51. Accordingly, the magnetic flux densities detected by the open/close sensor 50 and the rotation sensor 51 during this time do not exceed the respective thresholds.

Next, the relationship between the operation state of the movable display device 40, the display state of the LCD panel 41, and the detected state of each of the open/close sensor 50, the rotation sensor 51, and the close sensor 31 will be described with reference to FIG. 8. FIG. 8 is a table illustrating the relationship between the operation state of the movable display device 40, the display state of the LCD panel, and the detected state of each sensor.

When the movable display device 40 is in the state illustrated in FIG. 3A, or in the state illustrated in FIG. 3B, as described above, the open/close sensor 50 and the rotation sensor 51 are turned off. On the other hand, the close sensor 31 is turned on in the state illustrated in FIG. 3A, and the LCD panel 41 is turned off (turned-off state). In the state illustrated in FIG. 3B, the system control unit 30 performs image display control to display an image (image data) obtained by the image sensor 70 on the LCD panel 41 in the normal display state.

In the state illustrated in FIG. 3C, as described above, the open/close sensor 50 and the rotation sensor 51 are both turned on. In this state, the system control unit 30 performs image display control to display the image obtained by the image sensor 70 on the LCD panel 41 in the vertically inverted display state. This state is a display state suitable for the user to perform self-imaging.

In the state illustrated in FIG. 3D, as described above, the open/close sensor 50 is turned off and the rotation sensor 51 is turned on. In this state, the system control unit 30 performs image display control to display the image obtained by the image sensor 70 on the LCD panel 41 in the horizontally and vertically inverted display state. In this state, the electronic apparatus can be used with the same feeling as that of an electronic apparatus including a non-movable display device mounted on a rear surface thereof. FIG. 8 does not illustrate a case where the open/close sensor 50 is turned on and the rotation sensor 51 is turned off. However, in this case, the LCD panel 41 may be set to the normal display state.

According to the present exemplary embodiment, in the electronic apparatus having the function of detecting the operation state of the movable display device 40, the arrangement layout of the open/close sensor 50, the rotation sensor 51, the close sensor 31, and the magnet 52 is appropriately set. Accordingly, the electronic apparatus according to the present exemplary embodiment can perform the operation of a plurality of sensors (three sensors that detect the rotation state, the open/close state, and the close state) by using only one magnet 52. According to the present exemplary embodiment, it is possible to provide an electronic apparatus and an image pickup apparatus which are capable of detecting the state of the display unit using a magnetic sensor and are reduced in size and easily assembled.

While the exemplary embodiments of the present disclosure have been described above, the present disclosure is not limited to the exemplary embodiments, and can be modified and changed in various ways within the scope of the disclosure.

While in the present exemplary embodiment, a lens interchangeable type image pickup apparatus (such as a single-lens reflex camera or a mirror-less camera) is described as the electronic apparatus, the present exemplary embodiment is not limited to this example. The present exemplary embodiment can also be applied to a lens-integrated image pickup apparatus (such as a digital camera or a mobile terminal including an image pickup apparatus), or other electronic apparatuses including a movable display device.

According to the exemplar embodiments of the present disclosure, it is possible to provide an electronic apparatus and an image pickup apparatus which are capable of detecting the state of the display unit using a magnetic sensor, and are reduced in size and easily assembled.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-208688, filed Oct. 25, 2016, which is hereby incorporated by reference herein in its entirety.

What is claimed is:

1. An electronic apparatus comprising:
a display unit configured to be rotatable with respect to a main body unit in a first direction about a first axis and a second direction about a second axis being different direction from the first axis;
a magnet configured to generate a magnetic field;
a first sensor configured to detect, based on the magnetic field, a first state of the display unit in the first direction;
a second sensor configured to detect, based on the magnetic field, a second state of the display unit in the second direction;
a third sensor configured to detect, based on the magnetic field, a third state of the display unit; and
a controller configured to control a display state of the display unit based on the first state, the second state, and the third state,
wherein placement of the first and second sensors, and placement of the third sensor are symmetrical with respect to the second axis.

2. The electronic apparatus according to claim 1,
wherein the first axis and the second axis are perpendicular to each other,
wherein the first direction corresponds to an open/close direction of the display unit with respect to the main body unit, and the second direction corresponds to a rotation direction of the display unit with respect to the main body unit,
wherein the first sensor detects, as the first state, an open/close state of the display unit with respect to the main body unit, the second sensor detects, as the second state, a rotation state of the display unit with respect to the main body unit, and the third sensor detects, as the third state, a close state of the display unit with respect to the main body unit.

3. The electronic apparatus according to claim 1,
wherein the display unit is held in a movable display device configured to be rotatable with respect to the main body unit through a hinge unit,
wherein the first sensor, the second sensor, and the third sensor are provided in the main body unit, and
wherein the magnet is provided in the movable display device.

4. The electronic apparatus according to claim 3, wherein a magnetized direction of the magnet is perpendicular to a direction along the first axis.

5. The electronic apparatus according to claim 4, wherein the first sensor is disposed so as to incline with respect to the magnetized direction of the magnet.

6. The electronic apparatus according to claim 5,
wherein the magnet is provided at a position closer to the hinge unit than to a center of the movable display device, and
wherein the first sensor and the second sensor are provided on the first axis.

7. The electronic apparatus according to claim 5,
wherein the first sensor detects the magnetic field in a direction inclined with respect to the magnetized direction of the magnet, and
wherein the second sensor detects the magnetic field in a direction parallel to the first axis.

8. The electronic apparatus according to claim 1, wherein the third sensor is provided at a position shifted from the first axis.

9. The electronic apparatus according to claim 1, wherein a distance from a center of the first sensor to the second axis is equal to a distance from a center of the magnet to the second axis.

10. An image pickup apparatus comprising:
an image sensor configured to perform photoelectric conversion on an optical image formed through an image pickup optical system;
a display unit configured to be rotatable with respect to a main body unit in a first direction about a first axis and a second direction about a second axis being different direction from the first axis;
a magnet configured to generate a magnetic field;
a first sensor configured to detect, based on the magnetic field, a first state of the display unit in the first direction;
a second sensor configured to detect, based on the magnetic field, a second state of the display unit in the second direction;
a third sensor configured to detect, based on the magnetic field, a third state of the display unit; and
a controller configured to change a display state of an image obtained by the image sensor on the display unit according to the first state, the second state, and the third state,
wherein placement of the first and second sensors, and placement of the third sensor are symmetrical with respect to the second axis.

* * * * *